United States Patent [19]

Poland

[11] Patent Number: 4,825,058

[45] Date of Patent: Apr. 25, 1989

[54] BAR CODE READER CONFIGURATION AND CONTROL USING A BAR CODE MENU TO DIRECTLY ACCESS MEMORY

[75] Inventor: McKee D. Poland, Palo Alto, Calif.

[73] Assignee: Hewlett-Packard Company, Palo Alto, Calif.

[21] Appl. No.: 918,944

[22] Filed: Oct. 14, 1986

[51] Int. Cl.$^4$ .............................................. G06K 7/10
[52] U.S. Cl. ..................................... 235/472; 235/383
[58] Field of Search ................................ 235/472, 383

[56] References Cited

U.S. PATENT DOCUMENTS

| | | | |
|---|---|---|---|
| 4,481,412 | 11/1984 | Fields | 235/472 |
| 4,516,016 | 5/1985 | Kodron | 235/472 |
| 4,608,487 | 8/1986 | Awane | 235/472 |

*Primary Examiner*—Harold I. Pitts
*Attorney, Agent, or Firm*—James M. Williams

[57] ABSTRACT

A bar code reader configuration and control system uses an interpreter routine in the operating system of the bar code reader and a menu with bar code tags encoded to invoke instructions which directly access and manipulate the system's memory. The instructions encoded in the bar code labels on the menu can access any memory address in the operating system to load any value at a given bit or byte location. By changing the values at the accessed memory locations, the menu tags perform two kinds of functions, configuring the operating characteristics of the bar code reader and controlling the operation of the reader.

7 Claims, 5 Drawing Sheets

BAR CODE READER CONFIGURATION AND CONTROL USING A BAR CODE MENU TO DIRECTLY ACCESS MEMORY

SUMMARY AND BACKGROUND OF THE INVENTION

The invention relates to configuring and controlling the operation of a bar code reader, an electronic instrument, or a computer, by scanning bar code tags selected from an menu. In particular, the invention relates to such a system that affects the configuration and control of the bar code reader by making direct access to the memory of the operating system for the bar code reader.

Bar code readers are used to input information from bar code tags. Simply by scanning the bar code tag with a hand held wand or scanner, an operator can enter data for inventory control, process evaluation or point-of-sale pricing and various other operations. The scanned data may be processed by the bar code reader or relayed via a communications network to a remote host computer. Ideally, the bar code reader should be able to handle input from a variety of bar code tag encoding formats and should also be able to operate with various communication formats. In order to do so, it may be necessary to reconfigure or reprogram the operation of the bar code reader to suit the tag formats or communication format being used.

A particularly advantageous way of reconfiguring a bar code reader is by using the wand to scan commands for input rather than using a keyboard to enter the commands or an application program on the host computer to download the commands from the host computer. The set of commands for reconfiguring the reader are encoded in a special set of bar code tags on a menu. Scanning the bar code tags on the menu is easy for the operators of the bar code reader who are skilled in its operation but may not be skilled in computer operation. It also may eliminate the need for having an input keyboard in the bar code reader. Finally, scanning avoids errors in entering the commands necessary to perform the reconfiguration or change the operation of the bar code reader.

The bar code tags in existing configuration menus each initiate a separate pre-programmed routine to perform some configuration setting. Each tag must be recognized individually by the software in the bar code reader by matching the scanned character sequence to one command in a pre-defined command set. This approach has several disadvantages. The command set must be defined when the hardware for the bar code reader is designed and implemented in a set of integrated circuit chips. Thereafter, it is not easy to add new commands or to change the operation of any command. To add a function to the repertoire, a new bar code tag would have to be printed. In addition, the bar code reader software would have to be recoded to recognize the new bar code tag and to incorporate a routine to perform the new function. This drawback imposes constraints at an early stage in the development of the bar code reader system. It imposes additional limitations on the adaptability of the system to changing needs in the bar code environment. That is, it is difficult to add a new bar code format or to adapt the operation of the bar code reader for needs that are recognized after the circuit chips have been designed.

An object of the invention is to provide a bar code reader system which overcomes the constraints of a pre-defined command set. This enables the processor hardware design for the bar code reader to be completed early without limiting the operating flexibility of the system.

Another object of the invention is to provide a system for configuration and control for a bar code reader using a bar code menu, which allows errors in the menu to be easily corrected and allows flexibility in the make-up and operation of configuration and control commands.

These and other advantages are provided by the bar code reader configuration system of the invention which uses an interpreter routine in the operating system of the bar code reader and a menu with bar code tags encoded to invoke instructions which directly access and manipulate the system's memory. The instructions encoded in the bar code labels on the menu can access any memory address in the operating system to load any value at a given bit or byte location. Once the memory map of locations and their uses is known, the choice of memory locations and arguments for the instructions encoded in the menu tags can be made without making any changes to the bar code reader's operating system software. Thus, after the software development of the bar code reader is completed and the product is in the field, new combinations of configurations and new functions can be added to the bar code menu repertoire simply by printing new menu tags.

The menu tags are encoded to perform two kinds of functions, configuring the operating characteristics of the bar code reader and controlling the operation of the reader. All of the stored configuration options for the bar code reader, as well as the flags which control the operation of the reader, are stored in defined memory locations in the bar code reader hardware The commands encoded in the tags, consisting of instructions with opcodes and arguments, emulate a simple assembly level language since they have a defined instruction set and syntax. Their primary capability is to modify variables, performing direct memory manipulation.

In the preferred embodiment, the system includes a bar code reader with a scanner for reading bar code tags, and a processor with operating system software. The operating system controls the operation of the bar code reader by checking a series of flags in a loop routine, where the flags trigger the execution of system functions. The operating system also uses flags and bytes in the memory to represent configuration options used for bar code decoding and communication processes. The operational commands as well as the configuration instructions are entered by scanning bar codes from a menu to generate character sequences to invoke the instructions from a set of memory manipulation instructions which access memory locations in the operating system. An interpreter routine parses the input stream from the bar code scanner, checks for syntax errors, and executes the memory manipulation instructions invoked, thereby loading an input value at the accessed location. The menu in the preferred embodiment contains commands for implementing the standard set of configuration and control operations for the bar code reader.

DETAILED DESCRIPTION OF THE INVENTION

Figure 1:
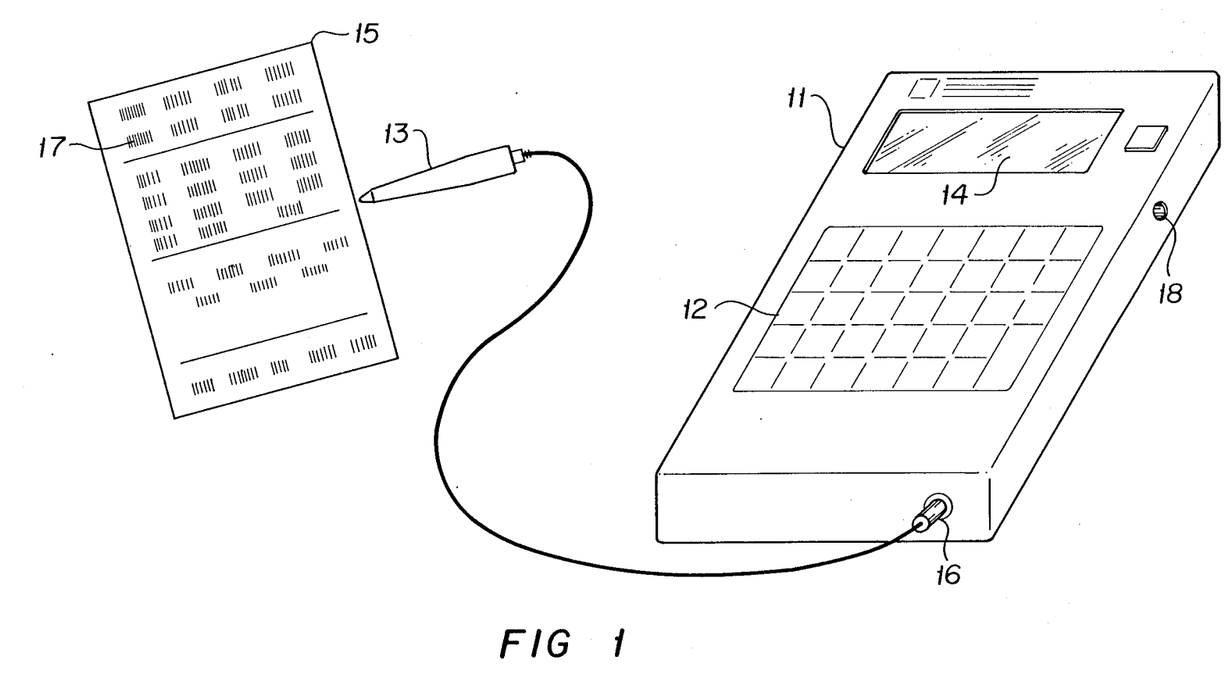
FIG. 1 shows the major components of the bar code reader and the menu configuration system.

The major components of the Bar code reader and the menu configuration system are shown in FIG. 1 bar code reader 11 has a keyboard 12 for command or data entry and a display 14 for information output to the operator. Bar code reader 11 also has an input plug 16 for connecting a bar code scanning device 13 which may be either a wand or a non-contact scanner. Data input from the scanner 13 is processed by the bar code reader and can be communicated to a remote host processor through a serial data port 18.

Commands to set the configuration or to control the operation of the bar code reader can be entered on the keyboard 12 or by using the scanner 13 to read one of the specially encoded bar code tags 17 on a menu 15. The bar code tags 17 contain encoded character strings which invoke instructions in a direct memory manipulation instruction set. These instructions consist of opcodes and arguments for direct manipulation of the memory locations in the bar code reader operating system software. The instruction may address a memory location which contains a stored configuration option for the bar code reader or it may address a memory location which holds a flag to control the operation of the reader. The use of menu tags which effect direct memory manipulation is in contrast to the menu tags used in conventional configuration menus which invoke discrete pre-programmed subroutines in the bar code reader software.

Figure 2:
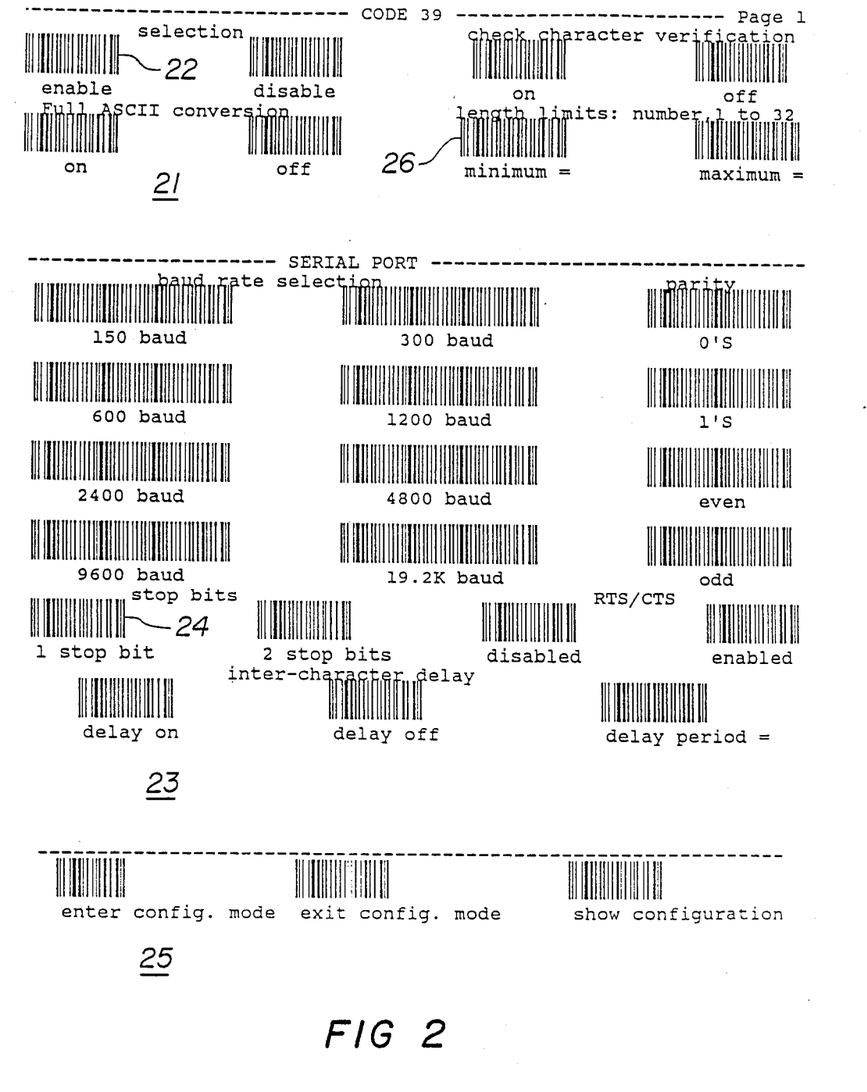
FIG. 2 shows a simplified example of a menu page from the set of menu pages used with the invention.

An illustration of a menu is shown in FIG. 2. The menu page shown in FIG. 2 is a simplified example of a menu page chosen to illustrate selection of a bar code encodation format and configuration of the communication format for the bar code reader. A full implementation of the menus required to control the configuration and operation of a bar code reader would comprise a number of menu pages. For example, in the preferred embodiment, the menu set would include several pages for selecting and the bar code symbologies the reader would recognize, a page for setting the communications configuration, pages for controlling the feedback response of the reader to the operator for successful and unsuccessful bar code reads, and number and character menu pages for entering alphanumeric character strings for certain of the configuration commands. A major advantage of the system of the invention is that additional menu tags for added functions or configurations could be added easily to the original set without the need to recode the operating system software.

Referring again to FIG. 2, the menu page illustrated is divided into three fields. Field 21 contains the bar code tags associated with configuring the bar code reader to recognize a particular bar code symbology, the "Code 39" symbology. Field 23 contains the bar code tags associated with configuring the serial output port of the bar code reader for communications. Field 25 contains three commonly used tags, one for entering the configuration mode, another for exiting the configuration mode and a third to display the current configuration on display 14.

Field 21 contains the bar code tags needed to configure the bar coder reader to recognize and decode the Code 39 symbology. The configuration options include selection of the symbology, setting check character verification, choosing ASCII conversion, and assigning the label length limits.

Each of the steps has a group of bar code tags to invoke the instructions to perform the memory manipulation function required. For example, under the selection step there are two bar codes, one to enable the reading of Code 39 symbology and a second to disable reading of Code 39 tags. When enabled, the bar code reader will recognize Code 39 tags and when disabled, scans of Code 39 tags will be ignored. To enable Code 39, the operator simply scans the enable bar code tag.

Under check character verification, there are two choices, on and off. When on, only tags which include a valid Code 39 check character will be read. When off, tags will be read whether or not a valid check character is present.

The ASCII conversion feature also has two selections, on and off. When on, character pairs encoded according to the extended Code 39 symbology will be converted to the corresponding ASCII characters in the decoded message. When off, no ASCII conversion will take place and individual characters will be presented in the decoded message as they are encoded in the tag.

Assigning label length limits selects the minimum and maximum character length strings that will be read as valid labels. The selection operation for this configuration attribute is slightly different. It requires two scans, a scan of the label to choose either minimum or maximum value, followed by a scan of the number from the alphanumeric menu to designate the value of the variable for minimum or maximum length.

Field 23 contains the bar code tags necessary to configure the bar code reader's serial output port. The menu allows configuration of the usual data communications parameters: baud rate selection, parity selection, choice of 1 or 2 stop bits, use of Request to Send and Clear to Send (RTS/CTS) handshakes for the communication protocol, and selection of the intercharacter delay period. Again, for each of these attributes there is a group of bar code tags to select a particular value or option for the attribute.

Field 25 at the bottom of the menu page contains three bar code tags. One tag causes the bar code reader to enter the configuration mode, a second causes the bar code reader to exit the configuration mode, and the third tag causes the bar code reader to display the current configuration so the operator can determine whether the configuration has been set properly. For convenience, the enter configuration mode, exit configuration mode and display configuration tags are reproduced at the bottom of each page of the menu so that the user can minimize the amount of page turning during the configuration session.

One example of changing the configuration of the bar code reader is to change the baud rate for the reader's serial port interface. A certain memory location contains the value which determines the choice of baud rate. When the user scans the label entitled twelve hundred in the Baud Rate Selection area (see FIG. 2, Field 21), the baud rate memory location is addressed and its value is changed to the value representing twelve hundred baud. The serial port transmission routines access this memory location to determine the baud rate and therefore will henceforth transmit information at a rate of twelve hundred baud.

An example of controlling an operation is causing the bar code reader to transmit a status message on the serial port. This operation is controlled by setting a memory flag at a certain memory address. When the user scans a tag labelled "transmit a status message", (not shown) the interpreter causes the flag to be set at that location. The operating system periodically checks the flag, and finding it set, transmits the status message. Thus, by scanning the bar code menu tag, the operator directly controlled the operation of the reader.

Each of the bar code tags on the configuration menu has a special sequence that identifies it as a menu tag rather than a data bar code tag. The reader will read tags with the menu prefix only when it is in configuration mode and will read bar code tags without the menu prefix only when it is not in configuration mode.

Figure 3:
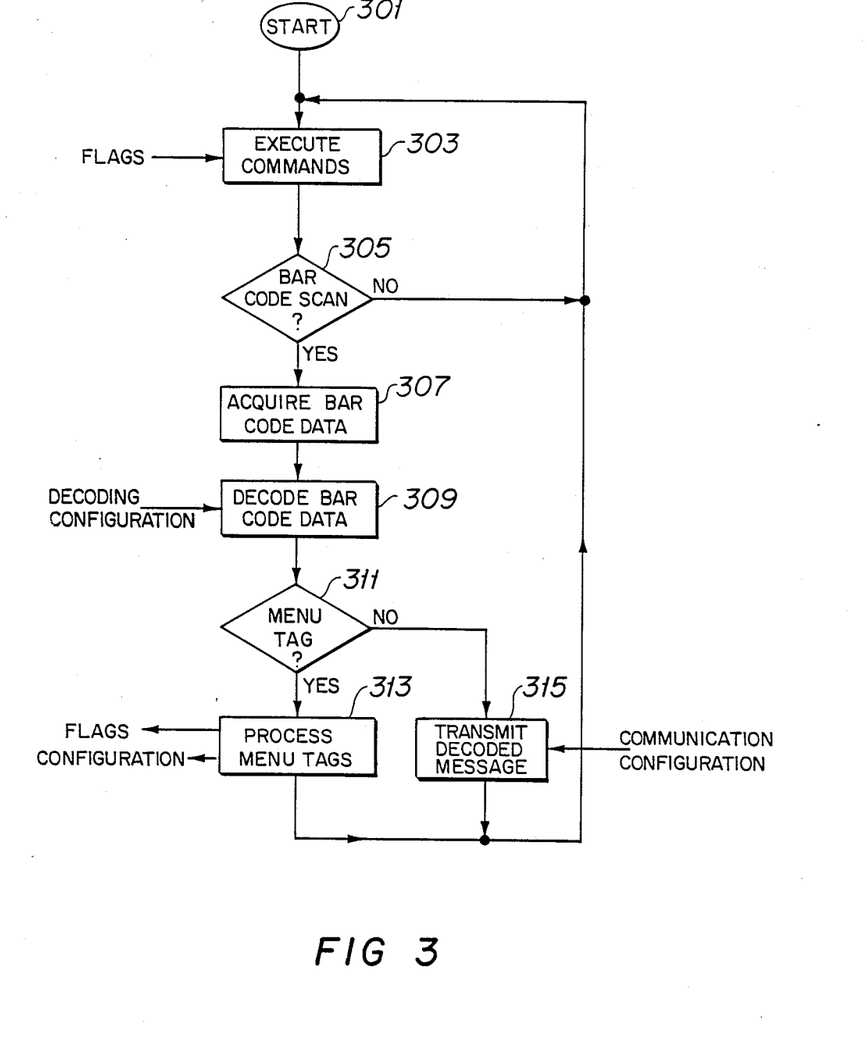
FIG. 3 shows a simplified flow chart of the operating system of the bar code reader.

The operating system of the bar code reader follows the simplified flow chart shown in FIG. 3. Operation starts at block 301 when the reader is turned on or reset. From there, the program enters a loop in which it continues to execute a series of commands as long as no bar code input is being scanned, as determined at decision point 305. The series of commands, block 303, is executed under the control of a set of flags which can be set by the menu tags as described below. When a bar code is scanned, the program follows the yes branch from decision point 305, acquires the bar code data at block 307, then decodes the bar code data at block 309. Decoding proceeds according to the decoding configuration stored in memory. The program branches at decision block 311 depending on whether the decoded information is a menu tag or a data tag. If it is a data tag, the no branch from block 311 is followed and the decoded bar code message or data is transmitted at block 315 using the communications configuration stored in memory. If the bar code input is a menu tag, control follows the yes branch from block 311 to process the menu tag and execute the instruction sequence invoked. This process is described in more detail below and serves to set the operation control flags or alter the configurations bytes or flags. From either block 313 or block 315, the program control returns to the loop including blocks 303 and 305 until another bar code tag is scanned.

Figure 4:
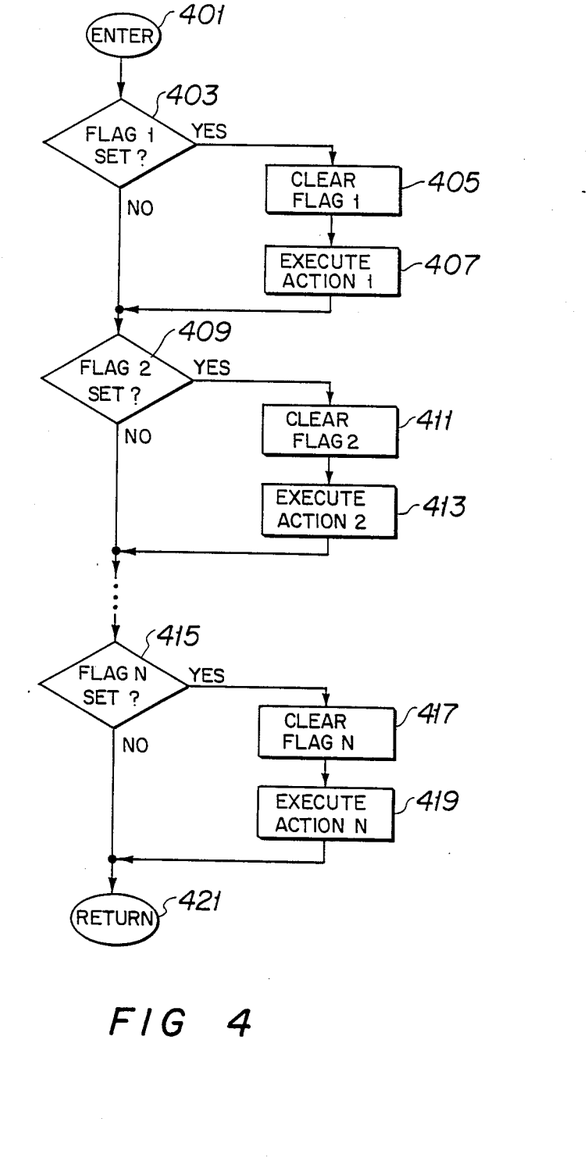
FIG. 4 shows a more detailed flow chart of the execute 1 commands routine, block 303, of FIG. 3.

The execute commands routine, block 303, is shown in more detail in FIG. 4. Upon entering the routine at block 401, the program proceeds to check a series of flags at decision points 403, 409, etc. until it reaches the last flag, flag n at block 415. If a flag is not set, the program simply proceeds to check the next flag in the series. Upon finding a flag set, the program follows an alternate branch to clear the flag and execute the action associated with the flag. For example, if flag 1 is set, the program follows the yes branch from decision point 403 to clear flag 1 at block 405, and to execute action 1 at block 407, then returns to the main branch of the program to continue checking the flags. Similarly, if flag 2 is set, the program follows the yes branch from decision point 409 to clear flag 2 at 411 and execute action 2 at block 413 before returning to the main branch of the program. Using this routine, a wide variety of bar code reader operations can be controlled. For example, the bar code reader could be triggered to transmit its serial number, or transmit a status message indicating the type of the last bar code read, whether the bar code was scanned in the forward or reverse direction, and any prevailing error conditions Other operations controlled by flags could include displaying the configuration of the bar code reader, sounding a tone, or performing a soft reset of the system. After the program has proceeded through the series of flags, ending with the blocks 415, 417 and 419 for flag n, the program returns to the main program via block 421 to check for the scanning of a bar code at block 305.

Interpreter

The interpreter implements the memory manipulation instructions. During operation, as the operator scans bar code tags on the menu, a decoding routine in the reader translates the printed bar code patterns into character sequences according to the regular rules of the bar code symbology. Then the interpreter routine parses the resulting decoded character sequence. The menu tags are differentiated from normal bar code tags by a unique character sequence encoded at the beginning of each menu tag. The interpreter routine checks for syntax errors and executes the memory manipulation instructions. The effects of the bar code tag scanned are exhibited as the operating system software of the bar code reader returns to executing commands, decoding and input/output operations and accesses the memory locations that have been changed.

Figure 5:
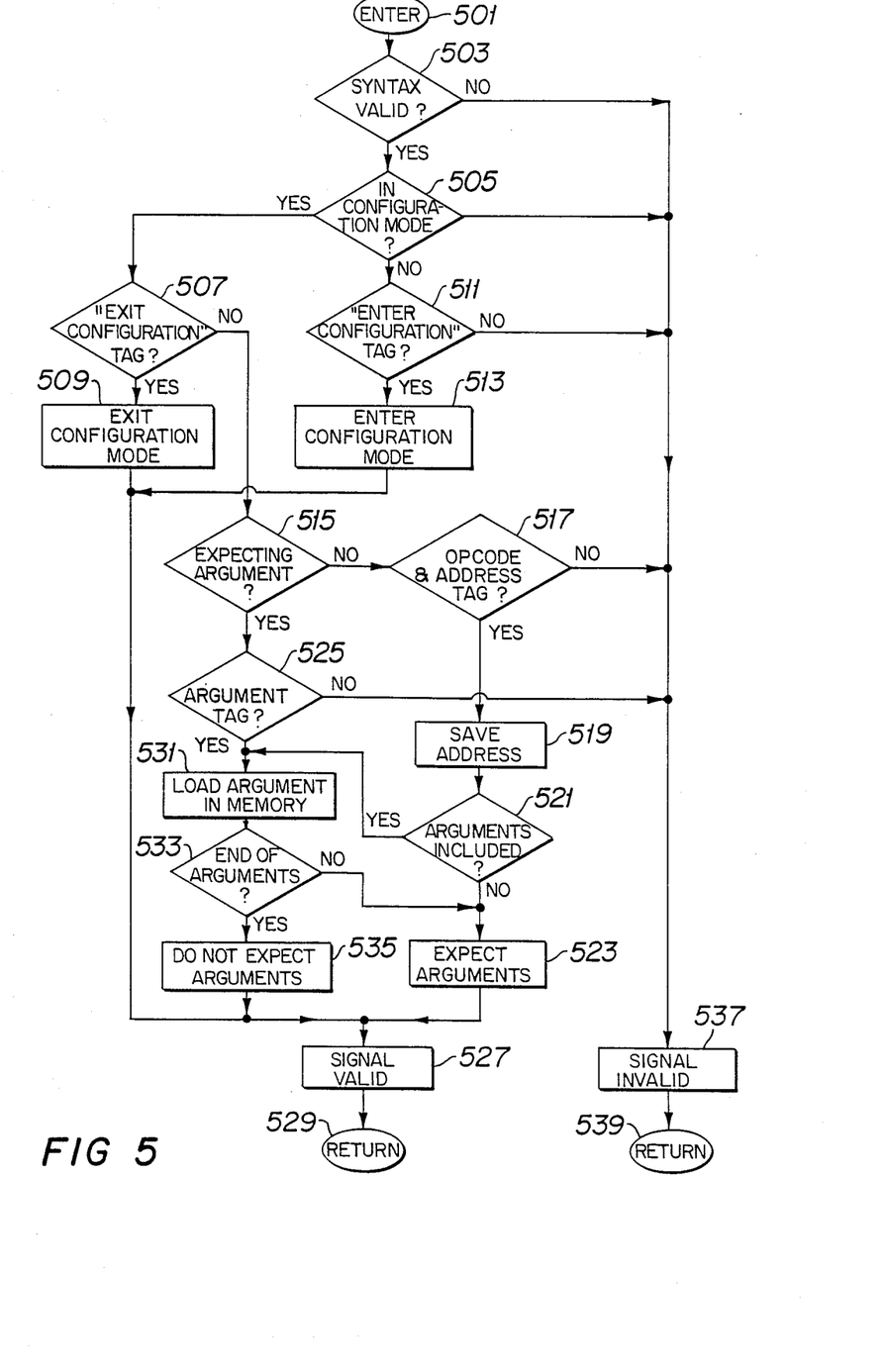
FIG. 5 shows a more detailed flow chart of the interpreter, block 313, of FIG. 2.

The operation of the interpreter, block 313 on FIG. 2, to process bar code menu tags is shown in more detail in FIG. 5. Upon entry at block 501, the syntax of the command is checked at block 503. If the syntax is invalid, there is an error, so program follows the no branch from block 503, produces a menu scan error feedback signal at block 537 and returns to the main program at block 539. If the syntax is valid, the program follows the yes branch from decision block 503 and enters a series of blocks from 505 to block 513 which determine whether the reader is in the configuration mode and if the scanned tag is the enter or exit configuration mode tag.

First, at block 505 the program determines whether the reader is in the configuration mode. If it is, the yes branch from block 505 is followed to decision point 507, to determine if the scanned tag is the exit configuration mode tag. If it is the exit configuration mode tag, the yes branch from block 507 is followed. The flag to exit the configuration mode is set in block 509, the valid menu scan feedback signal is sent at block 527 and the program returns via block 529. Following the other branch from block 505, if the program is not at present in the configuration mode, at block 511 it determines whether the scanned tag is the enter configuration mode tag. If it is not, an error has occurred; a menu tag has been scanned when the reader is not in configuration mode. The program produces the menu scan error feedback signal at block 537 and returns at block 539. If a command is the enter tag, the flag to enter the configuration mode is set a block 513, then the valid menu scan feedback signal is sent at block 527 and the program returns via block 529.

The other possibility is that the reader is in the configuration mode and the scanned tag is not the exit tag. In this case, control follows the no branch from decision block 507 and proceeds to process and execute the input command in blocks 515 through 535. To understand the operation of this section of the program, it is important to realize that there are three different types of commands. The first type is a single scan command that includes a memory manipulation opcode, an address and an argument to complete a configuration selection. The second type of command requires two scans, a memory manipulation opcode with an address, followed by a separate numerical or single character argument to complete a configuration selection. The third type of command requires multiple scans, a memory manipulation opcode with an address, followed by a string of single character arguments from separate tags, and is terminated by scanning an end of characters tag.

The interpreter accommodates each of these three type of command sequences. First, at decision block 515, the program determines whether it is in the middle of one of the multiple scan command sequences, that is, if an argument rather than an opcode and address scan is expected. If an argument is not expected, it is the beginning of a command sequence. A memory manipulation opcode and address tag is expected, and the no branch from block 515 is followed. At block 517, the input is examined to determine if the scanned tag is an opcode and address tag as expected. If not, the no branch from block 517 is followed, the menu scan error feedback signal is produced at block 537 and the program returns via block 539.

If the scanned tag is an opcode and address tag, the program proceeds to save the address at block 519. Next, the input is checked to see if an argument is included at block 521. For a single scan type command including an opcode, address and argument, the program follows the yes branch from block 521. It loads the arguments into memory at block 531, checks to determine that no more arguments are expected at decision block 533 and sets the "do not expect further arguments" flag at block 535. The cycle for this type of command would be completed by sending the valid menu scan feedback signal at block 527 and returning via block 529.

For the two-scan type of command the input would not include an argument, so the program would follow the no branch from block 521. At block 523, the "expect further arguments" flag would be set, then the valid menu scan feedback signal would be sent at block 527 and the program would return via block 529. With the "expect further arguments" flag set, on the next scan the yes branch would be followed from block 515. The input is examined at block 525 to determine whether it is an argument tag, as expected. If it is not, an error has occurred and the menu scan error feedback signal is sent at block 537 and the program returns via block 539. If the scanned tag is an argument, the yes branch from block 525 is followed and the program proceeds to load the argument into memory at block 531, at the address saved at block 519. For a two-scan command this will be the end of the arguments and the yes branch from block 533 will be followed, to set the flag "do not to expect further arguments" flag at block 535, send the valid menu scan feedback signal at block 527 and return via block 529.

For multiple argument type commands, the program will follow the no branch from block 533 keeping the "expect arguments" flag set at block 523 until the end of characters tag is scanned to indicate the end of the arguments, causing the program to follow the yes branch from block 533.

It is important to note that in processing the menu tags, the interpreter program sets the configuration of the bar code reader by accessing memory addresses and loading arguments into those memory locations directly. It does not need to match individual tags with a predetermined set of commands or to call other subroutines to implement the commands.

The interpreter routine occupies a small fraction of the memory space that would be required to store all of the preprogrammed functions needed for a conventional menu configuration system to perform the same functions. The number of operations configurable by such a conventional menu system is limited by how much memory space is available to support each preprogrammed function. In contrast, in a system of the invention, the number of options is limited only by how many menu tags are printed. In effect, the encoded tags emulate a simple assembly level language invoking the simple defined instruction set and syntax of the interpreter. The primary capability is to modify the variables at the selected address locations in the operating system software to effect a change in configuration or in operation. The memory manipulation instruction set holds a very limited number of instructions to implement the loading of memory locations. The simplicity of this instruction set conserves memory space in the operating system and provides efficient operation of the interpreter. In the preferred embodiment, only eight instructions are necessary. Two instructions clear and set bits at given bit addresses. These instructions are used to clear and set flags. Two other instructions are used to load bytes into a given address in either of two memory spaces available to the processor. One instruction indicates that the scanned data is an argument, another indicates the end of a character string. There is an instruction to perform a jump to a given address in the operating system software for the bar code reader. Finally, there is a special instruction to enter the configuration mode and to clear errors.

Operation

In operation, to enter the configuration mode and use the bar code menus, the operator first scans the enter configuration mode tag. Then, bar code menu tags can be scanned until the desired changes in the configuration are complete. Then the user must scan the exit configuration mode tag to resume normal reading operations.

This protocol provides an extra safeguard against inadvertent reconfiguration of the reader. Furthermore, while in configuration mode, scans of normal bar code tags are rejected, including normal data tags encoded in the symbology used for the menu tags.

As described above, the configuration operations from the menu are of three types: (1) a single scan command that completes a configuration selection, (2) a two-scan command requiring one scan of an opcode and address, and a second scan of a numerical or character set argument to complete a configuration setting, and (3) a multiple-scan command which includes one scan of an opcode and address, followed by one or more scans of alphanumeric arguments terminated by scanning the end-of-characters tag.

The most common command is the first type. An example from this category is the tag 22 to enable decoding of Code 39 format bar codes, under the "CODE 39 -- selection" heading, see Figure 2, field 21. Another example is the tag 24 to select one stop bit, under the "SERIAL PORT -- stop bits" heading, see FIG. 2, field 23. Scans of this type can be performed in any order since each controls an entirely independent selection via a change to an independent memory location. A configuration option is complete as soon as the tag has been scanned.

The multiple scan commands make use of the number menu and character menu included in the full set of menu pages. An example of a two-scan command is the tag 26 to select the minimum length limit for Code 39 tags, under "CODE 39 -- length limits: number, 1 to 32", see FIG. 2, field 21. After scanning the minimum length tag, it is necessary to scan one of the number tags from the number menu. As soon as the number has been scanned, that configuration selection process is complete. It is preferred that all of the available numbers in the selection range are encoded as single tags on the number menu, so that the selection can be completed in a minimum number of scans rather than forcing the user to build the number argument by scanning individual digits. This simplifies the syntax and reduces the risk of entry error. Several commands may require a single character argument to be scanned rather than a number. The character can be scanned from the character menu in the same way as the number is scanned from the number menu.

An example of a multiple scan command is the operation of appending a message buffer, in the form of a header or a trailer, to each decoded bar code read. (FIG. 2 does not show the tag to invoke this command.) After scanning the menu tag indicating that a header will be included, the characters of the buffer message must be scanned one by one from the character menu. The end of the message is signified by scanning the end of characters tag included in the character menu. As soon as that tag has been scanned, the configuration is complete.

It is preferred that the fields in the menu pages have explanatory text near the bar code tags indicating how many arguments are to be supplied. The text may specify a number argument or one or more character arguments. For numerical arguments, the acceptable range is also specified. For example, the "CODE 39 -- length limits" command specifies that a numerical argument in the range of 1 to 32 is required.

To aid the operator in performing configuration selections, there are three types of tone responses to scanning bar code menu tags. Single scan tags produce four high-pitched beeps at the valid menu scan feedback signal from block 527, signifying a complete configuration operation. Multiple-scan commands produce only two high-pitched beeps for each scan until the last argument has been scanned. Then four high-pitched beeps are heard indicating a complete operation. Finally, any time an invalid menu tag is scanned, at the menu scan error feedback signal from block 537, four low-pitched beeps are sounded to indicate a syntax error. Of course, any combination of audible output signals could be substituted for the signals described, as long as they distinguish the three responses described.

As long as each configuration selection is individually completed, configuration operations can be carried out completely independently. There is no constraint against moving from one category to another in a particular field or against moving from one field to another in any order. This is due to the fact that independent memory locations are used to store the configuration and operation control variables, and therefore can be accessed in any order by the memory manipulation instructions.

From the discussion of the preferred embodiment, which describes how the invention can be used to configure and control a bar code reader, it will be understood that the invention can be applied to the configuration and control of other types of electronic instruments, such as oscilloscopes, counters, signal generators, and others. The invention can also be applied to the control of other microprocessor controlled devices.

I claim:

1. A method of configuring a microprocessor controlled device or controlling the operation of the device by direct manipulations of the memory locations in the microprocessor hardware, by executing memory manipulation instructions capable of accessing operating system memory locations to load data directly into a flag location or into a variable location that controls the configuration or operation of the operating system, said memory manipulations performed in response to scanning bar code tags selected form a menu, said bar code tags containing encoded memory manipulation instructions and the encoded data to be loaded.

2. The method of claim 1 wherein the microprocessor controlled device is a bar code reader.

3. A bar code reader system having an input scanner and a menu of bar code tags wherein the operation and the configuration of the bar code reader can be affected by scanning tags from the menu to perform direct manipulations of the memory locations in the bar code reader hardware, comprising:

an operating system that controls the operation and configuration of the bar code reader according to flag values and configuration variable values stored in memory;

a set of memory manipulation instructions for accessing flag value and configuration variable value memory locations in the operating system and loading an entered value at the accessed location;

a menu comprising a set of bar code tags that produce signals, when scanned with the input scanner, to directly invoke memory manipulation instructions; and an interpreter routine for parsing the signals from the input scanner and executing the invoked memory manipulation instructions to alter the values stored in memory and thereby to change the configuration options of the bar code reader and to control the operation of the bar code reader.

4. The bar code reader system of claim 3 wherein comprises sets of bar code tags for selecting configuration options to enable the reader to recognize and decode different bar code symbologies, for selecting configuration options for communications, and for controlling the execution of selected operations, and a set of bar code tags for alphanumeric character input.

5. The system of claim 4 wherein each of the tags on the menu has a prefix sequence that identifies it as a menu tag rather than a data bar code tag.

6. The system of claim 4 wherein the menu further comprises bar code tags for causing the system to enter the configuration mode, exit the configuration mode, and display the current configuration.

7. The bar code reader system of claim 3 wherein the operating system controls the operation of the bar code reader by checking a series of flags in a loop routine and performs bar code decoding and input/output communications operations according to configuration options stored in memory.

* * * * *

UNITED STATES PATENT AND TRADEMARK OFFICE
CERTIFICATE OF CORRECTION

PATENT NO. : 4,825,058

DATED : Apr. 25, 1989

INVENTOR(S) : McKee D. Poland

It is certified that error appears in the above-identified patent and that said Letters Patent is hereby corrected as shown below:

Column 3, line 6, "execute 1 commands" should read -- execute commands --

Column 6, line 37, "505" should read -- block 505 --

Column 10, line 46, "Wherein ("the menu" omitted)" should read -- Wherein the menu --

Signed and Sealed this

Eleventh Day of December, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,825,058　　　　　　　　　　　　　　　　　　　　　　　　　　Page 1 of 1
DATED : April 25, 1989
INVENTOR(S) : McKee D. Poland It is certified that error appears in the above-identified patent and that said Letters Patent is hereby corrected as shown below:

Column 10,
Line 17, delete "form" and insert therefor -- from --

Signed and Sealed this

Seventh Day of September, 2004

JON W. DUDAS
*Director of the United States Patent and Trademark Office*